(12) United States Patent
van Manen

(10) Patent No.: US 6,660,201 B1
(45) Date of Patent: Dec. 9, 2003

(54) METHOD OF MAKING A COMBINATION SPEAKER GRILL AND AUTOMOTIVE TRIM PANEL

(75) Inventor: Dick van Manen, Canandaigua, NY (US)

(73) Assignee: Meridian Automotive Systems, Inc., Dearborn, MI (US)

( * ) Notice: Subject to any disclaimer, the term of this patent is extended or adjusted under 35 U.S.C. 154(b) by 0 days.

(21) Appl. No.: 09/498,445

(22) Filed: Feb. 4, 2000

Related U.S. Application Data

(63) Continuation-in-part of application No. 09/260,799, filed on Mar. 1, 1999.

(51) Int. Cl.⁷ .................. B29C 65/70; B29C 43/20
(52) U.S. Cl. ............ 264/156; 264/163; 264/243; 264/255; 264/263; 264/322; 264/324; 156/245; 156/256; 425/289; 425/515; 425/520
(58) Field of Search ................ 264/156, 163, 264/257, 266, 263, 243, 255, 324, 274, 322; 425/515, 520, 320.1; 156/256, 245

(56) References Cited

U.S. PATENT DOCUMENTS

| | | |
|---|---|---|
| 3,415,714 A | 12/1968 | Hider et al. |
| 3,419,455 A | 12/1968 | Roberts |
| 3,620,906 A | 11/1971 | Hannes |
| 3,629,052 A | 12/1971 | Knoepfler et al. |
| 3,687,873 A | 8/1972 | Kropscott et al. |
| 3,836,192 A | 9/1974 | Wilfert |
| 3,917,779 A | 11/1975 | Breer et al. |
| 3,928,693 A | 12/1975 | Rudloff |
| 3,929,948 A | 12/1975 | Welch et al. |
| 3,961,001 A | 6/1976 | Bethe |
| 3,973,066 A | 8/1976 | Smith, II et al. |
| 3,989,869 A | 11/1976 | Neumaier |
| 4,018,646 A | 4/1977 | Ruffo et al. |
| 4,045,076 A | 8/1977 | Day, Sr. et al. |
| 4,087,224 A | 5/1978 | Moser |
| 4,089,919 A | 5/1978 | Sanson |
| 4,129,635 A | 12/1978 | Yasuike et al. |
| 4,201,835 A | 5/1980 | Jellinek et al. |
| 4,229,036 A | 10/1980 | Toda |
| 4,240,857 A | 12/1980 | Vecchia et al. |
| 4,242,398 A | 12/1980 | Segawa |
| 4,247,586 A | 1/1981 | Rochlin |
| 4,269,884 A | 5/1981 | Della Vecchia et al. |
| 4,307,059 A | 12/1981 | Cambio |
| 4,323,625 A | 4/1982 | Coran et al. |
| 4,327,053 A | 4/1982 | Cogswell et al. |
| 4,478,660 A | 10/1984 | Landler et al. |
| 4,491,556 A | 1/1985 | Fujii et al. |
| 4,546,899 A | 10/1985 | Williams |
| 4,569,873 A | 2/1986 | Robbins |
| 4,579,764 A | 4/1986 | Peoples, Jr. et al. |
| 4,579,774 A | 4/1986 | Kuwazuru et al. |
| 4,668,567 A | 5/1987 | Williams |
| 4,740,417 A | 4/1988 | Tornero |
| 4,824,504 A | 4/1989 | Kagata |
| 4,879,170 A | 11/1989 | Radwanski |

(List continued on next page.)

FOREIGN PATENT DOCUMENTS

JP  59-202834  * 11/1984

*Primary Examiner*—Stefan Staicovici
(74) *Attorney, Agent, or Firm*—McDonnell Boehnen Hulbert & Berghoff

(57) ABSTRACT

A method of manufacturing a rear shelf trim and speaker grill panel (12) for an automotive vehicle (10) includes steps of punching a substrate layer (16) of a polypropylene and flax material with a punch set (46) to form a grill section (60) and placing a decorative carpet layer (18) over the substrate layer (16) and molding the two layers into a combined speaker grill and rear shelf trim panel (12).

9 Claims, 5 Drawing Sheets

U.S. PATENT DOCUMENTS

| | | |
|---|---|---|
| 4,908,176 A | 3/1990 | Kato |
| 4,934,736 A | 6/1990 | Huisman |
| 4,968,474 A | 11/1990 | Ito |
| 4,992,320 A | 2/1991 | Gower |
| 5,040,335 A | 8/1991 | Grimes |
| 5,091,031 A | 2/1992 | Strapazzini et al. |
| 5,100,187 A | 3/1992 | Loren |
| 5,111,619 A | 5/1992 | Billin et al. |
| 5,120,593 A | 6/1992 | Kurihara et al. |
| 5,141,279 A | 8/1992 | Weller |
| 5,162,092 A | 11/1992 | Klobucar et al. |
| 5,171,054 A * | 12/1992 | Wilson .................... 296/37.16 |
| 5,171,058 A | 12/1992 | Ishikawa |
| 5,308,896 A | 5/1994 | Hansen et al. |
| 5,328,759 A | 7/1994 | McCormack et al. |
| 5,352,480 A | 10/1994 | Hansen et al. |
| 5,354,606 A | 10/1994 | Kjelby et al. |
| 5,437,919 A | 8/1995 | Welich et al. |
| 5,614,285 A | 3/1997 | Gardill |
| 5,770,134 A * | 6/1998 | Hara et al. .................. 264/154 |
| 5,939,682 A * | 8/1999 | Hartmann .................. 181/150 |
| 6,365,084 B1 * | 4/2002 | Terajima .................... 264/257 |

* cited by examiner

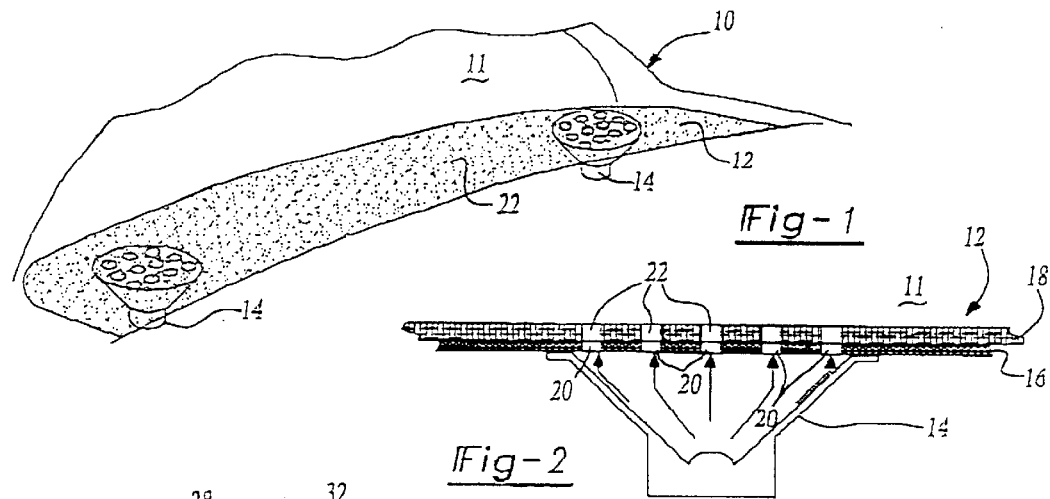
Fig-1
Fig-2
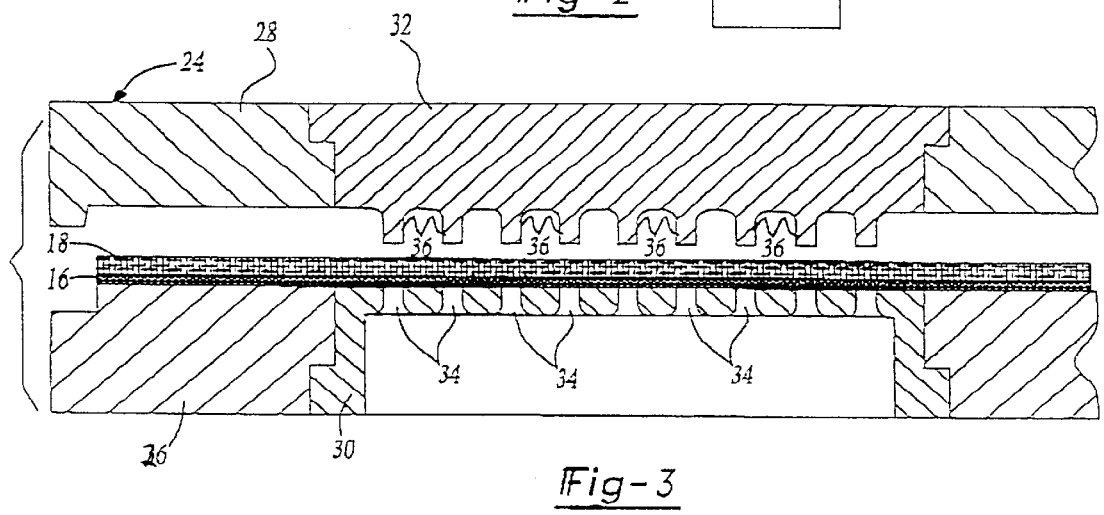
Fig-3
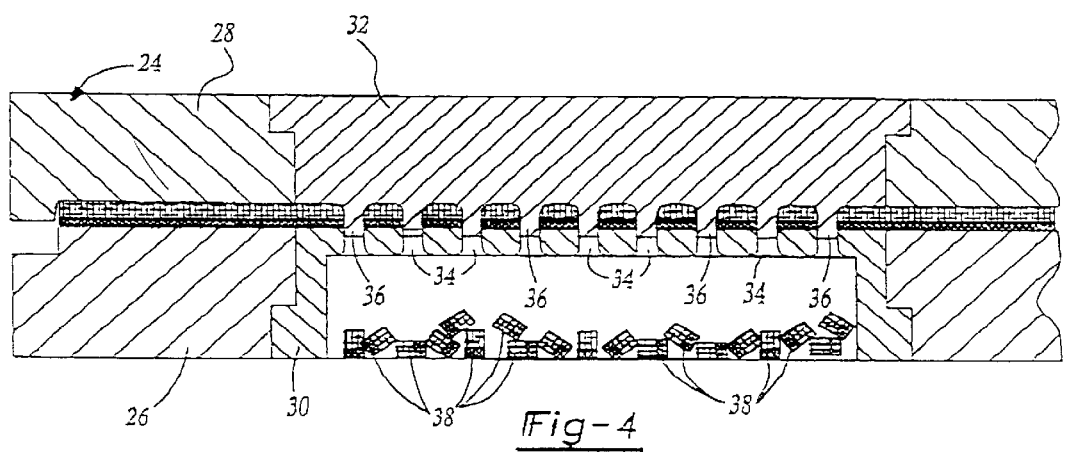
Fig-4

METHOD OF MAKING A COMBINATION SPEAKER GRILL AND AUTOMOTIVE TRIM PANEL

This application is a continuation-in-part of patent application U.S. Ser. No. 09/260,799 filed Mar. 1, 1999, now pending.

FIELD OF THE INVENTION

The invention relates to a method of making a rear shelf trim panel with speaker apertures to accommodate a speaker mounted under the rear shelf trim panel.

BACKGROUND OF THE INVENTION

Many motor vehicles now have FM stereo radios or more elaborate sound systems such as tape players, compact disc players, digital tapes and computer sound systems with accompanying speakers for the enjoyment of the driver and passengers. Furthermore, the electronics of the sound system have also greatly improved. As a result, of all these improvements, the sound emanating from a car stereo speaker has a quality that was unheard of only a few years ago.

Many after-market speakers are free standing with their own cases and speaker grills. The speaker grill is commonly used to conceal and protect the actual speaker cone against puncture or other damage. Factory mounted speakers are often mounted in concealed places such as behind door panels and under rear trim shelf panels. When the speakers are positioned behind or under such panels, the panels must incorporate a speaker grill that has apertures and cutouts to reduce muffling effects of the panels and to promote the efficiency of sound emanating from the concealed speakers into the interior of the motor vehicle.

Many known speaker grills are molded. Pins are used in the mold to form apertures through the cover to allow sound emanation. A porous cloth or non-woven fabric may provide a fabric covering for the speaker grill. While the panel needs holes to allow transmission of sound, a light porous cloth or fabric may cover the holes in the panel structure without an overly undesirable amount of sound blockage.

What is needed is an expeditious method of forming an integrated speaker grill with an automotive interior panel that has apertures incorporated therein to provide for the transmission of sound from the speaker into the automotive vehicle interior.

SUMMARY OF THE DISCLOSURE

In accordance with one aspect of the invention, a process for forming a combined speaker grill and automotive interior trim panel includes the initial step of providing a substrate layer of a heated mat material having a content.of thermoplastic material such that it is moldable under heated conditions. Preferably the mat also has a content of flax fiber. The process also includes punching a plurality of apertures in a speaker grill section of the heated substrate. The punching of the apertures is, in one embodiment, simultaneous with the molding step such that the apertures are formed through both the substrate and the decorative layer as the substrate and decorative layer are shaped into the final panel contour.

A decorative layer is provided onto the heated substrate. The decorative layer is preferably a porous carpet with a thermal plastic back surface.

The substrate and the decorative layer are molded into the desired shaped panel such as a rear shelf trim panel such that said apertures form an integrated speaker grill section within the panel.

Preferably, a first and second mold dies form the apertures in the substrate. The first mold die has apertures therein and the second mold die has a punch set that fits in the apertures of the first mold die to punch apertures through both the decorative layer and the substrate as the mold dies are closed to shape the substrate and the decorative layers into the panel.

In one embodiment, the apertures in the substrate are formed in the speaker grill section before the substrate is molded into its final shape. The grill section is positioned such that pins are then received in the apertures in the grill section and the decorative layer is positioned over the substrate, grill section and the pins in the mold. The mold is closed and the substrate layer, grill section and decorative layer are molded into a shape of an automotive interior panel under pressure.

In one embodiment, the speaker grill section is a separate previously formed perforated member that is placed over an opening of the substrate layer such that a peripheral edge of the perforated grill section overlaps an edge of the substrate layer about the opening. A hot melt adhesive is applied to the perforated grill section for adhesion to the decorative layer.

The substrate is then removed from the pins and mold. The apertures in the grill section are positioned under the decorative layer, i.e., the molded panel has the decorative layer spanning over the apertures in the grill section of the substrate.

Preferably, the pins extend through a first mold die and are level with an interior surface of the first mold die. The apertures in the substrate are formed by a first punch set aligned with the pins to push through the substrate and recess the pins. The punch set is then raised to remove the punched scraps of substrate. The pins are then raised to intrude into the apertures in the substrate. A second mold die that complements the first mold die is provided and the panel is molded into shape with the pins extending through the first mold die and remaining in the apertures in the substrate.

In accordance with another aspect of the invention, a process for forming a combined speaker grill and automotive interior trim panel is characterized by the steps of providing a decorative layer that is capable of being bonded to the substrate layer; placing the heated substrate layer and decorative layer into an open mold; closing the mold and molding the substrate layer and the decorative layer into a formed automotive interior panel under pressure between two closed mold dies with a first mold die section having a section with a plurality of holes therein and a complementary mold die section having a plurality of punches that mate with the plurality of holes to punch a plurality of apertures in the formed panel to form an integral speaker grill with the panel; and opening the mold dies and cooling the panel to be resolidified with the substrate and decorative layers being bonded together and removing the molded formed panel and speaker grill from the mold.

In accordance with another aspect of the invention, a process for forming a combined speaker grill and automotive interior trim panel is characterized by the steps of: providing a grill section and substrate layer of a heated mat material having a content of thermoplastic material such that it is moldable under heated conditions; punching out a plurality of apertures in the grill section; positioning said grill section such that a pin is received in each respective aperture with an end of the pin substantially coplanar with one side of the grill section; providing a decorative layer that is capable of being bonded to the substrate layer and said grill section; molding the substrate layer, grill section, and the decorative layer into a formed automotive interior panel under pressure between two closed mold dies with the decorative layer spanning over the pins in the apertures in the substrate to form an integrated speaker grill with the panel; removing the molded formed panel and speaker grill after the thermoplastic material in the panel is cooled to allow the panel to be resolidified and the substrate and decorative layers to be bonded together.

In accordance with another aspect of the invention, a process for forming a combined speaker grill and automotive interior trim panel is characterized by the steps of: providing a substrate layer of a heated mat material having a content of thermoplastic material such that it is moldable under heated conditions; providing an aperture in the substrate layers; that is slightly smaller than the grill section placing a perforated grill section over the opening in the substrate with the respective edges overlapping, positioning a pin in each respective hole in the grill section with an end of the pin substantially coplanar with one side of the grill section; providing a decorative layer that is capable of being bonded to the substrate layer and grill section; molding the substrate layer grill section and the decorative layer into a formed automotive interior panel under pressure between two closed mold dies with the decorative layer spanning over the pins in the apertures in the substrate to form a integral speaker grill with the panel leaving an edge of the substrate layer uncovered; and punching out an additional grill section with a plurality of holes; removing the molded formed panel and speaker grill after the thermoplastic material in the panel is cooled to allow the panel to be resolidified and the substrate and decorative layers to be bonded together; and removing the punched out additional grill section for placement in an aperture of an another substrate layer.

In accordance with another aspect of the invention, a molded interior automotive panel and speaker grill combination includes a molded substrate layer having thermal plastic content and a flax fiber content. A plurality of apertures through the substrate are aligned with a speaker-mounted therebehind. A decorative layer is bonded on top of the substrate material and molded thereto. In one embodiment, the decorative layer is a porous carpet layer that spans over the plurality of apertures. In another embodiment, the decorative layer also has apertures therethrough that align with the apertures in the substrate. In another embodiment, a separate grill section is received over an opening through the substrate. Both the grill section and substrate are made from the same material. The grill is then bonded to the substrate about the aperture with the carpet layer spanning over both the grill and substrate.

BRIEF DESCRIPTION OF THE DRAWINGS

Reference is now made to the accompanying drawings in which:

FIG. 1 is a perspective view of a rear shelf trim panel according to one embodiment of the invention;

FIG. 2 is an enlarged segmented view of rear shelf trim panel shown in FIG. 1 with a speaker mounted thereunder;

FIG. 3 is a fragmentary sectional view through the lower and upper molds before molding of the rear trim panel shown in FIG. 2;

FIG. 4 is a view similar to FIG. 3 during a cutting and molding step;

DETAILED DESCRIPTION OF THE PREFERRED EMBODIMENTS

Figure 5:
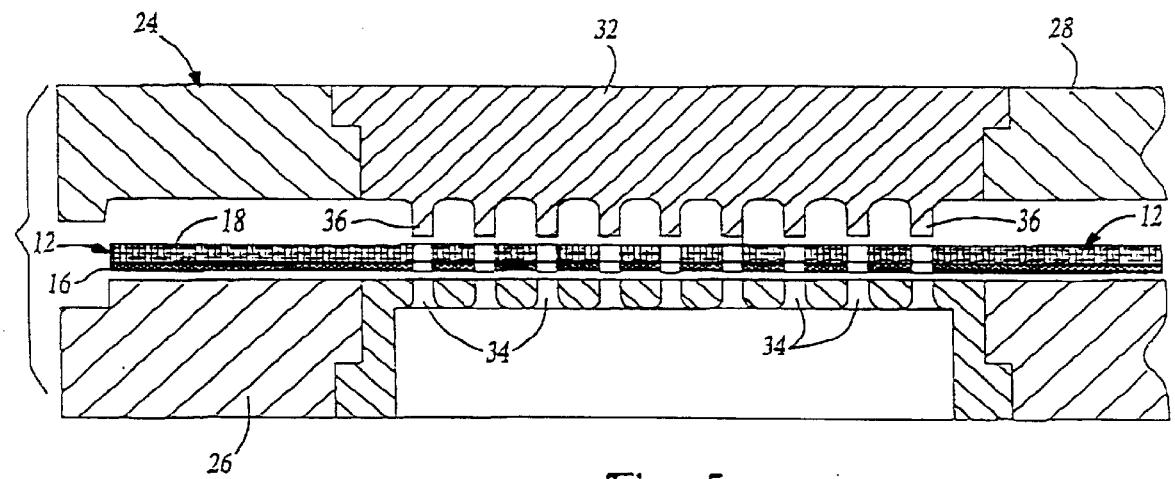
FIG. 5 is a view similar to FIG. 4 after the upper mold is raised subsequent to the cutting and molding step.

As shown in FIG. 1, an automotive vehicle 10 has a rear shelf trim panel 12 mounted in the interior 11 of the vehicle and has speakers 14 concealably mounted thereunder. The rear shelf trim panel 12 as more clearly shown in FIG. 2 has a substrate layer 16 and a decorative carpet layer 18. A plurality of apertures 20 and 22 extend through the substrate layer 16 and carpet layer 18 respectively. The apertures 20 through the substrate layer 16 are aligned with the apertures 22 through the carpet layer 18 to form passages that allow sound to transmit from the speaker 14 and into the automotive interior 11.

The particular shape and contour of the rear shelf trim panel may vary depending on the model vehicle. It may also accommodate a rear brake light that is not shown for simplicity of the drawing.

The rear shelf trim panel has its substrate layer 16 made from a blend of flax and polypropylene unwoven mat. While the composition and ingredients of the mat may change it is desirable to have a blend of 50% polypropylene and 50% flax by weight. It is easily foreseen that the percentage of flax may vary between 40–70% be weight depending on the particular requirements and applications. The unwoven mat may have an uncompressed thickness of 11 mm. The mat may then be heated and compressed to 3 mm substrate layer 16 in order to provide the desired structural rigidity for most applications in a rear shelf trim panel environment. The mat may be heated to 200° C. to provide that the thermal plastic, polypropylene, is in a molten and moldable state.

The preheated substrate layer 16 is positioned in a mold assembly 24 that has a core side mold die 26 and a cavity or upper die 28 as shown in FIG. 3. The core side die 26 has a die insert 30 and the cavity side 28 has a punch insert 32. The die insert 30 has a plurality of holes 34 that receive the punch dies 36 of insert 32. A decorative layer such as a porous carpet layer 18 with a polypropylene back surface is placed over the substrate layer 16.

The mold dies 26 and 28 are at ambient temperature and are heated only by the heated substrate layer 16 transfers to the mold dies. A cooling mechanism (not shown) may be provided to dissipate excess heat from the mold assembly 24.

The mold dies 26 and 28 are closed as shown in FIG. 4 such that the punch dies 34 push into the holes 34 in die insert 32. This causes punched scraps 38 of the carpet layer 18 and substrate layer 16 to be punched out and drop through the holes 34 in the die insert 30 to form apertures 20 and 22 simultaneously with the molding of the panel 12. A pressure of five bars provides sufficient compressive force to achieve part configuration within the mold.

As shown in FIG. 5, after the rear shelf trim panel 12 is molded, the mold dies are opened and the panel 12 is removed. The scraps 38 are also removed by a mechanism (not shown) that strokes once per cycle to remove the scraps 38.

Figure 6:
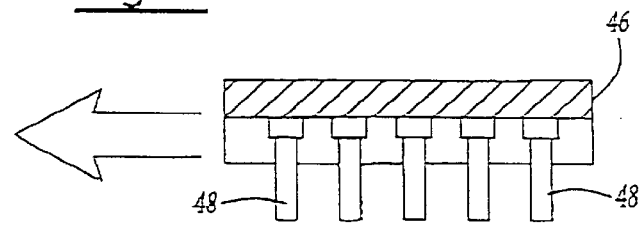
FIG. 6 is a fragmentary, segmented and schematic view of a lower mold and punch press illustrating a method of manufacturing a modified embodiment according to the invention.
Figure 6:
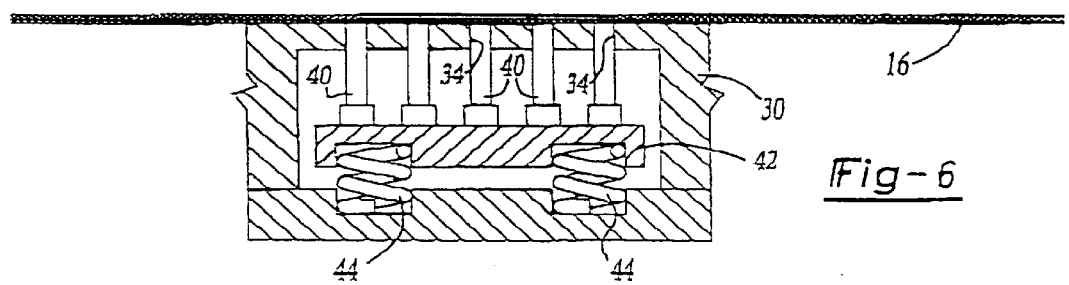
Figure 7:
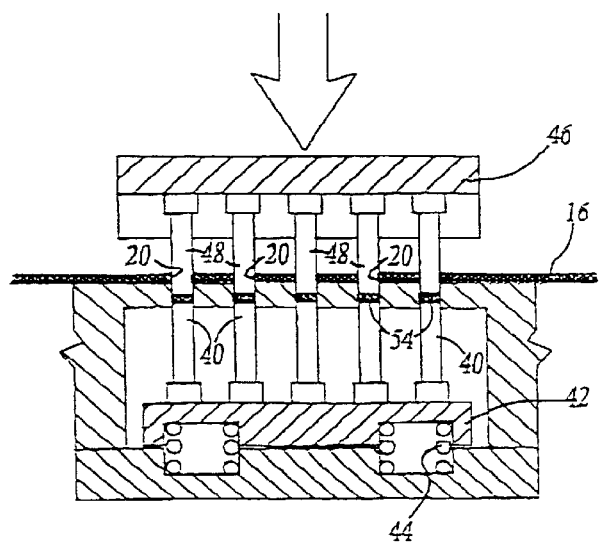
FIG. 7 is a view similar to FIG. 6 with the punch press punching apertures through the substrate layer.
Figure 8:
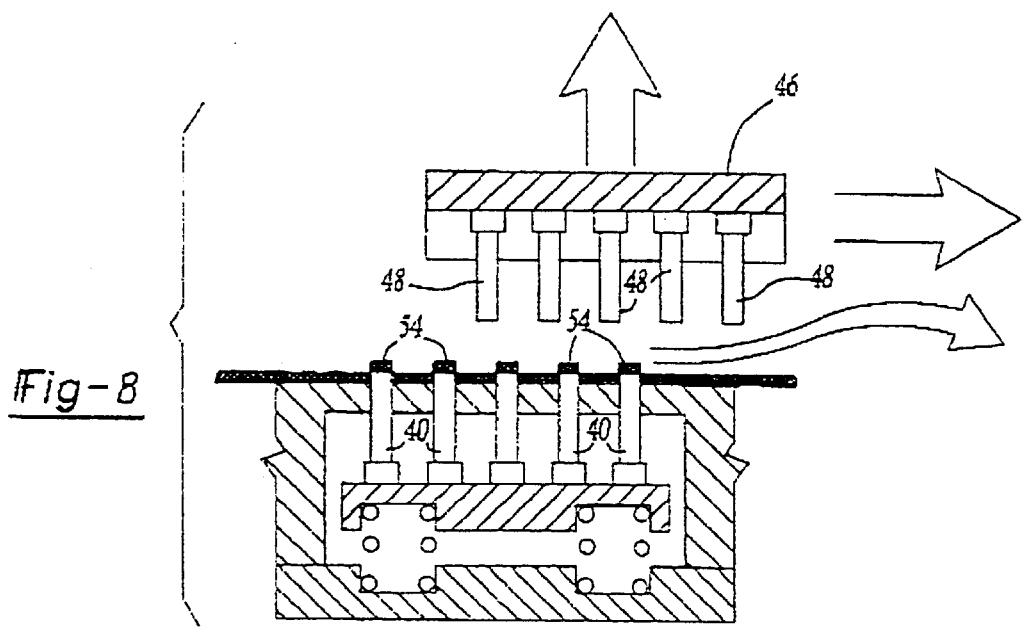
FIG. 8 is a view similar to FIG. 7 showing the punch press lifted up after punching apertures in the substrate layer.

Another embodiment can be made where the carpet layer 18 does not have apertures 22 therethrough. Alternatively, the carpet layer 18 spans over the apertures 20 in the substrate layer 16. The process for making this embodiment is schematically illustrated in FIGS. 6–11. In this process, a set of retractable pins 40 are biased upward by a platform 42 set on springs 44. The pins 40 extend through the apertures 34 in the die insert 30. The substrate layer 16 is placed in the core side mold die 26 over the retractable pins as shown in FIG. 6. As shown in FIG. 7, a die set punch section 46 has punch pins 48 that are aligned with pins 40 and punched to be received in holes 40. As a result the pins 48 punch holes 20 through substrate layer 16. As shown in FIG. 8, the punch set is lifted up and removed. The punched scraps 54 can be removed by lifting the pins 40 such they extend now through formed apertures 20 in layer 16. Alternatively, the pins 48 of the punch set may have barbed lower ends which pull out the scrap pieces 54 and be removed from the pins 48 by a comb style sweeper. A further modification may be that pins 48 have optional stripper sleeves to remove the attached scrap members 54. The important aspect is that the scraps 54 are removed so as not to interfere with the subsequent described steps.

Figure 9:
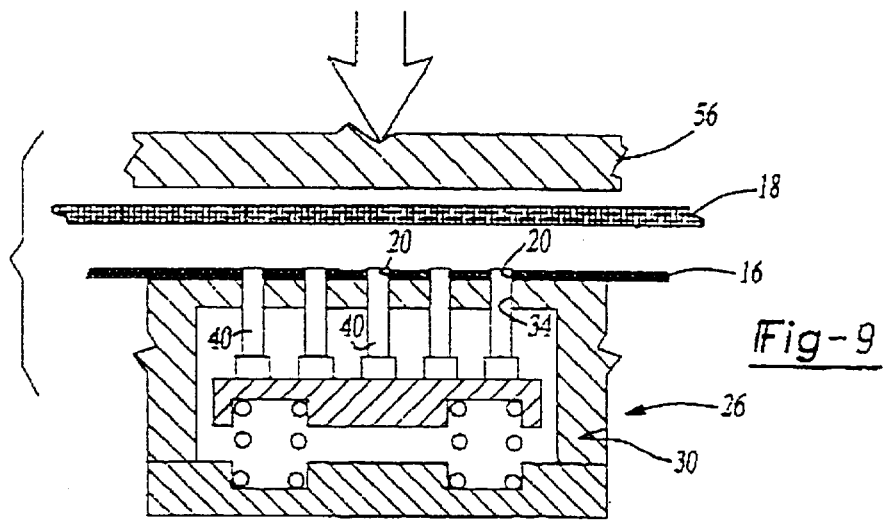
FIG. 9 illustrates the placing of a decorative layer and an upper mold die over the substrate layer and lower mold die.
Figure 10:
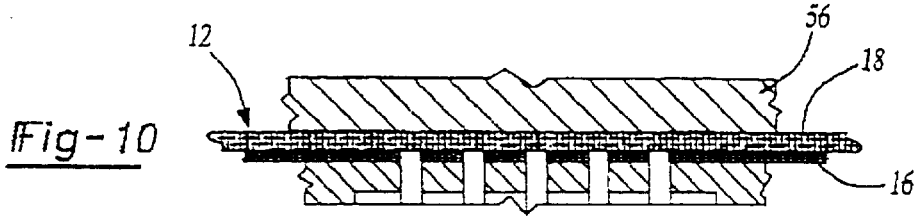
FIG. 10 is a view similar to FIG. 9 with the lower and upper mold dies shown in the closed position.
Figure 11:
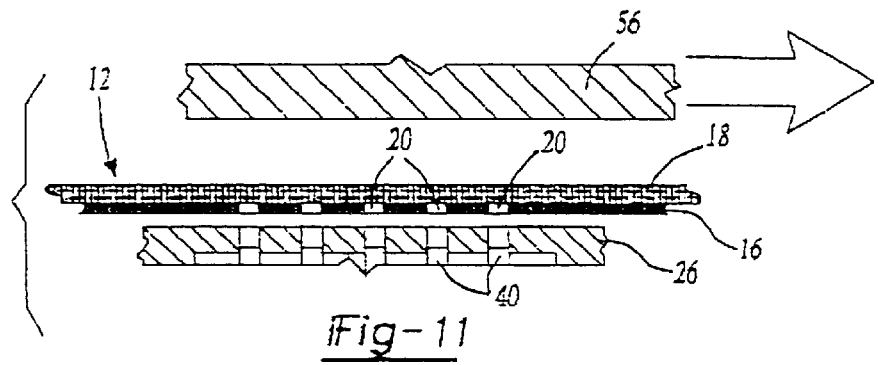
FIG. 11 is a view similar to FIG. 10 with the mold dies opened and the formed rear shelf trim panel lifted off the lower mold die.
Figure 12:
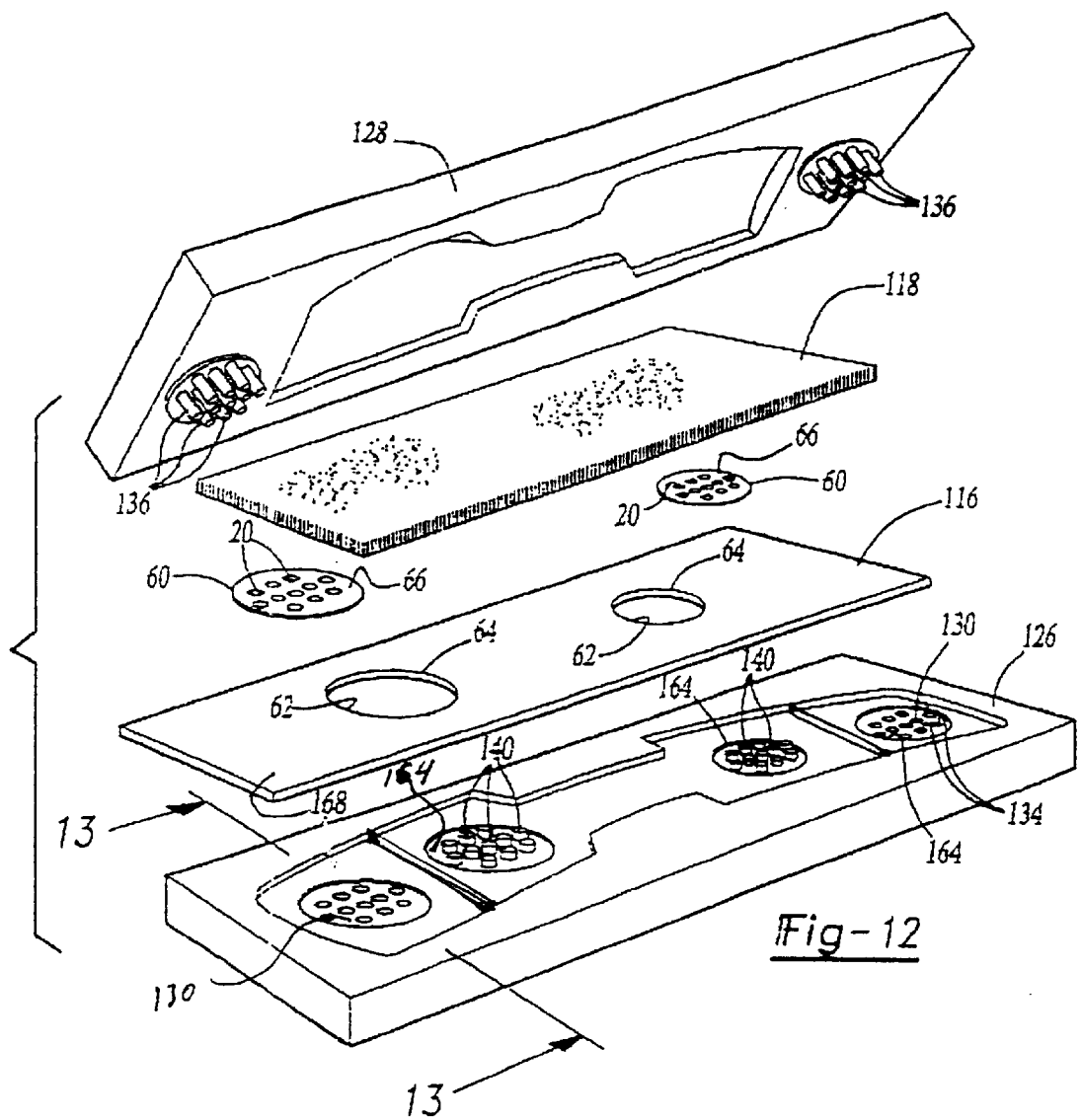
FIG. 12 is a perspective and exploded view of an alternate embodiment with the upper and lower mold pieces before assembly and molding.

As shown in FIG. 9, a decorative layer 18 such as the previously described carpet layer with a polypropylene back surface can then be placed over the substrate layer 16 and apertures 20. Pins 40 are retained in a lifted position and remain in the apertures 20. As shown in FIG. 10, an upper mold die 56 is then closed upon the lower mold die 26 and molds the carpet layer 18 and substrate layer 16 into shape and bonds the two together. After sufficient cooling, the upper mold die 56 is then lifted and the mold is open. The pins 40 are retracted from the apertures 20 and the formed panel 12 is then removed from core side mold die 26.

In this fashion, the apertures 20 are concealed by the porous carpet layer 18 but function substantially the same as the apertures 20 in the first embodiment, namely by allowing excellent transmission of sound of all audible frequencies from a speaker 14 that is mounted under the substrate layer 12 and into an interior 11 of an automotive vehicle 10.

In the alternate embodiment disclosed in FIGS. 12–15, each perforated grill section 60 is a separate member that is laid over as opening 62 in substrate layer 16. The opening 62 is through a recessed peripheral edge 64 that is recessed a single thickness of the grill section 60.

The grill section 60 contains the plurality of aperture 20 and is placed over aligned stationary pins 140 in lower mold are 126 after substrate layer 116 is positioned thereon with the mold having recess section 164 to accommodate recessed peripheral edge 64. A hot melt or other adhesive is then applied to the top surface 66 of the grill section 60.

Figure 15:
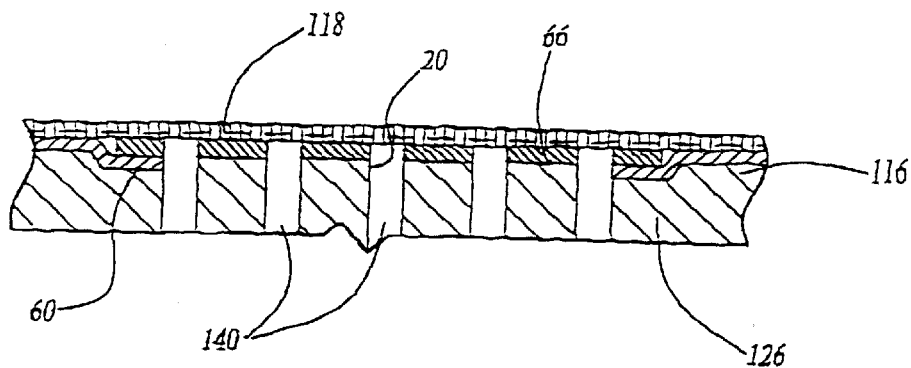
FIG. 15 is a cross-sectional view taken along lines 15—15 shown in FIG. 14

A carpet layer 118 is placed over substrate 116 to cover over both grill sections 60 but leaving end section 168 exposed. The mold dies 128 and 126 are closed where grill sections 60 and carpet larger 118 are molded and bonded to the substrate layer 116 over openings 62 as shown in FIG. 15.

Figure 13:
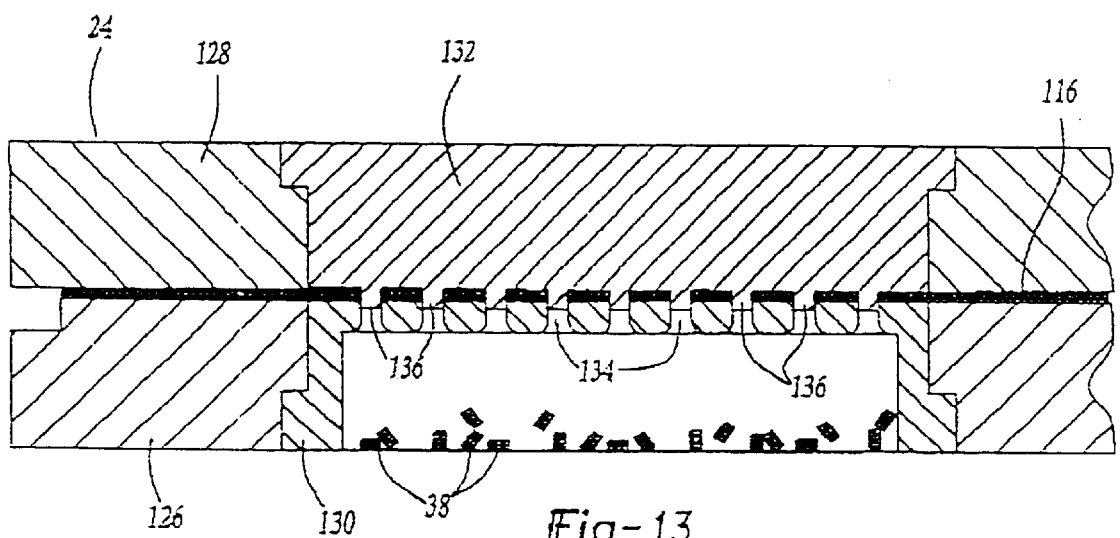
FIG. 13 is a cross-sectional view of taken along the lines 13—13 shown in FIG. 12 with the upper and lower molds being closed.
Figure 14:
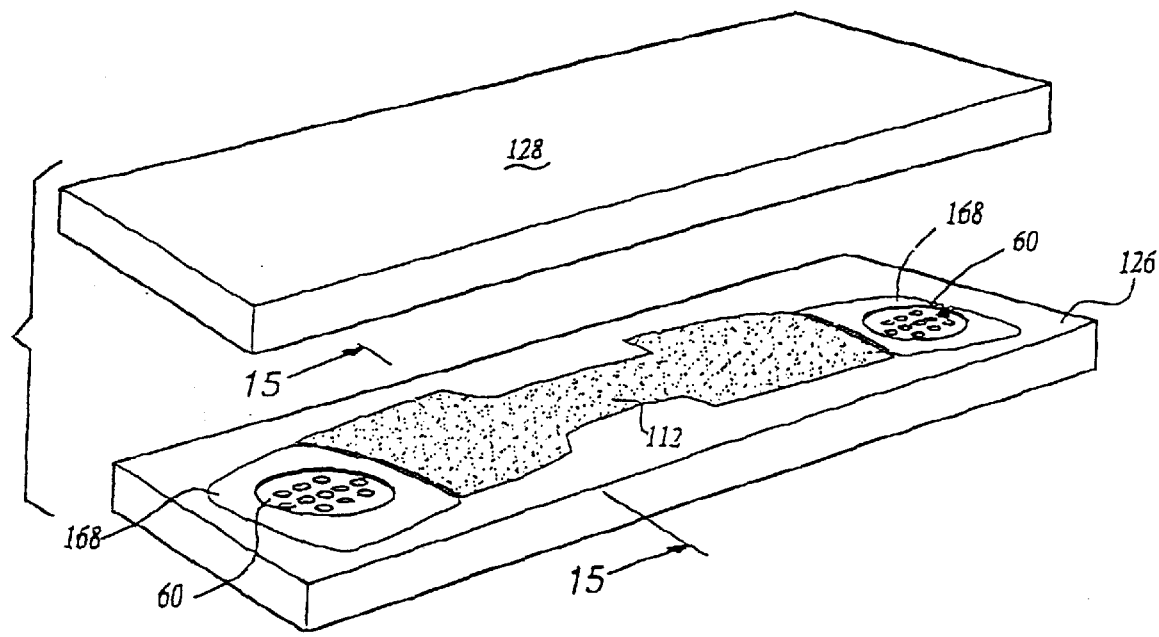
FIG. 14 is a view similar to FIG. 12 after molding and opening of the molds.

Simultaneously as shown in FIG. 13, two additional grill sections 60 to be used in the future are formed with aperture 20 via the punch and die set 130 and 136. Two end sections 168 of the substrate 16 are positioned over a die insert 130 in die 126. The die insert 130 has a plurality of apertures 134 that receive punch die 136 in the upper mold die 128. Scraps 138 drop through aperture 134. The molds 126 and 128 have cutters to also cut the grill section 60 from the end section 168 of the substrate. The mold dies opened after sufficient cooling and the parts are demolded forming a complete panel 112; two additional grill sections 60 and two scrap ends 168.

The cycle is then repeated with the additional grill sections 60 being used to form another panel 112.

Other variations and modifications are possible without departing from the scope and spirit of the present invention as defined by the appended claims.

I claim:

1. A process for forming an automotive interior trim panel, having apertures formed in a substrate layer, characterized by the steps of:

providing a substrate layer comprising thermoplastic material over a first mold die;

punching a plurality of apertures in said substrate layer using at least one punch set;

raising said at least one punch set;

raising one or more sets of pins aligned with said at least one punch set through said first mold die into said apertures in said substrate after said apertures are formed;

providing a decorative layer onto said substrate;

providing a second mold die that complements said first mold die and closing said first and second mold dies;

molding said panel into shape with said pins extending through said first mold die and remaining in said apertures in said substrate during said molding of said panel;

removing said substrate from said pins such that said molded panel has said decorative layer spanning over said apertures in said substrate.

2. The process of claim 1 wherein the substrate layer is a mat material having a content of thermoplastic material such that it is moldable under heated conditions.

3. The process of claim 1 wherein the substrate layer is heated prior to punching and molding.

4. The process of claim 1 wherein the apertures in the substrate layer form a grill section.

5. The process of claim 1 wherein the decorative layer is a porous carpet layer.

6. The process of claim 1 wherein the one or more sets of pins are spring-biased.

7. The process of claim 1 wherein said punch set and said one or more sets of pins are positioned such that the punch set, in a fully extended position, contacts said one or more sets of pins and depresses said one or more sets of pins beneath a surface of the first mold die.

8. The process of claim 1 wherein the at least one punch set are movably mounted in and extend through at least a portion of the second mold die.

9. The process of claim 1 wherein the one or more sets of pins are movably mounted in and extend through at least a portion of the first mold die.

* * * * *